(12) United States Patent
Ohta

(10) Patent No.: US 10,221,957 B2
(45) Date of Patent: Mar. 5, 2019

(54) SOLENOID VALVE

(71) Applicant: Koganei Corporation, Koganei-shi, Tokyo (JP)

(72) Inventor: Masuo Ohta, Koganei (JP)

(73) Assignee: Koganei Corporation, Tokyo (JP)

( * ) Notice: Subject to any disclaimer, the term of this patent is extended or adjusted under 35 U.S.C. 154(b) by 218 days.

(21) Appl. No.: 15/506,302

(22) PCT Filed: Mar. 26, 2015

(86) PCT No.: PCT/JP2015/059445
§ 371 (c)(1),
(2) Date: Feb. 24, 2017

(87) PCT Pub. No.: WO2016/031284
PCT Pub. Date: Mar. 3, 2016

(65) Prior Publication Data
US 2017/0254435 A1 Sep. 7, 2017

(30) Foreign Application Priority Data

Aug. 27, 2014 (JP) .................................. 2014-172350

(51) Int. Cl.
*F16K 31/06* (2006.01)
*F16K 7/16* (2006.01)
(Continued)

(52) U.S. Cl.
CPC ............ *F16K 31/0624* (2013.01); *F16K 7/16* (2013.01); *F16K 11/04* (2013.01); *F16K 31/06* (2013.01);
(Continued)

(58) Field of Classification Search
CPC . F16K 31/06; F16K 7/16; F16K 11/04; F16K 31/0624; F16K 31/0682;
(Continued)

(56) References Cited

U.S. PATENT DOCUMENTS 1,782,578 A * 11/1930 McCune .................. F16K 7/16
251/284
4,250,924 A * 2/1981 Sakakibara ......... F16K 31/0624
137/596.17
(Continued)

FOREIGN PATENT DOCUMENTS

JP S35-21653 Y 9/1960
JP S64-26077 A 1/1989
(Continued)

OTHER PUBLICATIONS

International Search Report for PCT Serial No. PCT/JP2015/059445 dated Jun. 2, 2015.

*Primary Examiner* — Matthew W Jellett
*Assistant Examiner* — Christopher Ballman
(74) *Attorney, Agent, or Firm* — McCormick, Paulding & Huber LLP

(57) ABSTRACT

A solenoid valve has a valve member (43) which is operated between: a closed position in which the valve member abuts on a valve seat to block communication between ports (32 and 33); and an open position in which the valve member separates from the valve seat to enable communication between the ports (32 and 33). A fixed iron core (18) and a movable iron core (21), in which the movable iron core reciprocatively moves in axial directions, are disposed in a bobbin (13) of a solenoid (11). In a valve housing (12) provided with ports (31 to 33), a swing member (41) having a valve element is swingably attached, and a pivotal lever (51) is pivotally attached. The pivotal lever (51) is provided with: an actuating portion (53) abutting on one end of the swing member (41); and an effort portion (54) abutting on the tip end of the movable iron core (21), an opening/closing stroke of the valve member (43) is made larger than the moving stroke of the movable iron core (21).

6 Claims, 4 Drawing Sheets

(51) Int. Cl.
  *F16K 11/04* (2006.01)
  *H01F 7/127* (2006.01)
  *F16K 7/14* (2006.01)
  *B01L 3/00* (2006.01)
  *F16K 11/052* (2006.01)

(52) U.S. Cl.
  CPC ........... *F16K 31/0682* (2013.01); *B01L 3/567* (2013.01); *F16K 7/14* (2013.01); *F16K 11/0525* (2013.01); *F16K 31/0641* (2013.01); *H01F 7/127* (2013.01); *Y10T 137/86847* (2015.04)

(58) Field of Classification Search
  CPC .... F16K 11/0525; F16K 7/14; F16K 31/0641; H01F 7/127; B01L 3/567; Y10T 137/86847
  See application file for complete search history.

(56) References Cited

U.S. PATENT DOCUMENTS

| | | | |
|---|---|---|---|
| 4,840,193 A | 6/1989 | Schiel | |
| 5,983,941 A * | 11/1999 | Fritz | F16K 11/052 137/625.44 |
| 6,220,299 B1 * | 4/2001 | Arvidsson | F16K 7/16 137/329.05 |
| 6,318,408 B1 | 11/2001 | Fukano et al. | |
| 7,195,035 B2 * | 3/2007 | Pechtold | F16K 11/052 123/DIG. 12 |
| 9,482,360 B2 * | 11/2016 | Bantz | F16K 27/029 |
| 2002/0134957 A1 * | 9/2002 | Paessler | F16K 31/0682 251/129.15 |
| 2003/0107018 A1 * | 6/2003 | Hettinger | F16K 11/052 251/129.19 |
| 2008/0006336 A1 | 1/2008 | Bai | |
| 2012/0223264 A1 | 9/2012 | Doerr et al. | |
| 2013/0277591 A1 * | 10/2013 | Scheibe | F16K 31/52 251/279 |
| 2016/0153577 A1 * | 6/2016 | Fuchs | H01F 7/066 251/129.2 |
| 2016/0334024 A1 * | 11/2016 | Futamata | B01L 3/567 |
| 2017/0067567 A1 * | 3/2017 | No | F16K 7/12 |
| 2017/0268688 A1 * | 9/2017 | Watanabe | F16K 11/044 |
| 2017/0268689 A1 * | 9/2017 | Ohki | F16K 31/06 |

FOREIGN PATENT DOCUMENTS

| | | |
|---|---|---|
| JP | H04-258581 A | 9/1992 |
| JP | H06-65671 U | 9/1994 |
| JP | H08-330130 A | 12/1996 |
| JP | 2000-297876 A | 10/2000 |
| JP | 2004-144243 A | 5/2004 |
| JP | 2005-315326 A | 11/2005 |
| JP | 2012-184845 A | 9/2012 |
| JP | 2013-61019 A | 4/2013 |

* cited by examiner

1

SOLENOID VALVE

CROSS-REFERENCE TO RELATED APPLICATIONS

This application is a National Stage application of International Patent Application No. PCT/JP2015/059445, filed on Mar. 26, 2015, which claims priority to Japanese Patent Application No. 2014-172350, filed on Aug. 27, 2014, each of which is hereby incorporated by reference in its entirety.

TECHNICAL FIELD

The present invention relates to a solenoid valve which uses a valve to open and close a communication hole in a valve seat.

BACKGROUND ART

To control supplying of pressurized fluid, such as liquid or gas, to an equipment to be supplied with the fluid, or to control pressurized fluid exhaust from the equipment, or further to control a process to switch communication passages, a solenoid valve which uses a valve member to open and close communication holes provided in a valve seat has been utilized.

In a two-port solenoid valve having a supply port communicating with a pressurized gas source and an output port communicating with an equipment to be supplied, the solenoid valve controls switching between a communicated state and a blocked state of the ports. On the other hand, in a three-port solenoid valve for gas having an exhaust port in addition to the supply port and the output port, the solenoid valve controls the switching between: a state in which the exhaust port is blocked of communication from the output port while the supply port is communicating with the output port, thereby supplying the pressurized gas to the output port; and a state in which the supply port is blocked of communication from the output port while the exhaust port is communicating with the output port, thereby discharging the pressurized gas which had returned to the output port to the outside through the exhaust port. Moreover, in a solenoid valve with ports for liquids which have one supply port to be supplied with pressurized liquid and two output ports for discharging the liquid to the outside, the solenoid valve controls the switching between: a state in which the liquid is supplied from the supply port to one of the output ports; and a state in which the supply port supplies the liquid to the other output port.

A solenoid which opens and closes the valve has a fixed iron core attached to a bobbin with a coil wound around and a movable iron core to be driven by an energized coil; thus, the valve member is driven by the movable iron core. The movable iron core is either axially movable or swingable. The axially movable iron core coaxially reciprocates in axial directions with the fixed iron core. On the other hand, the swingable movable iron core reciprocatively swings with one end portion of the movable iron core serving as the center.

Japanese Unexamined Patent Application Publication No. H08-330130 describes a solenoid valve having a swingable movable iron core. Japanese Unexamined Patent Application Publication No. 2000-297876, Japanese Unexamined Patent Application Publication No. 2004-144243 and Japanese Unexamined Patent Application Publication No. 2005-315326 describe solenoid valves having an axially movable iron core.

SUMMARY

In the solenoid valve having a swingable movable iron core as described in Japanese Unexamined Patent Application Publication No. H08-330130, the fixed iron core has a shaft portion and a magnetic frame, and is formed into a U-shape as a whole. The movable iron core is swingably attached to a tip end of the magnetic frame, with one end portion serving as the center of swinging movements. The other end portion of the movable iron core is actuated into a state to be attracted to the tip end of the shaft portion when the coil is energized, and into a state to be separated from the shaft portion by a spring force when de-energized. The swinging movements of the other end portion are transmitted to a valve rod to open and close a valve member. In this manner, in the swingable movable iron core, the fixed iron core, which has the shaft portion and the magnetic frame, is formed into a U-shape, thereby forming a magnetic circuit by using the fixed iron core and the movable iron core. For this reason, the width of the composed solenoid unit is increased by the coil and the fixed iron core wound with the coil. Thus, the solenoid valve has limitations in reducing its size.

On the other hand, in an axially movable iron core, the movable iron core and the fixed iron core are coaxially disposed, thereby the width of the solenoid unit is shortened and the size of the solenoid valve is reduced. To open and close a plurality of ports provided in a valve casing, a swingable valve member is disposed between the fixed iron core and the port; thereby the longitudinal dimension of the solenoid valve is shortened. Thus, the solenoid valve can be reduced in size.

However, as described in Japanese Unexamined Patent Application Publication No. 2000-297876, since a block-shaped displacement member is disposed between the movable iron core and the valve member, and a pushing member which is used to push the valve member is installed in the displacement member, the solenoid valve has limitations in reducing its longitudinal dimension. Moreover, as described in Japanese Unexamined Patent Application Publication No. 2004-144243, a pushing member is disposed parallel to a movable iron core in a valve body wherein the tip end of the movable iron core is protruding, and the movable iron core abuts on one end of the swing member while the pushing member abuts on the other end; therefore, the width of the solenoid unit and the longitudinal dimension of the solenoid valve are not reducible. In the same manner, as described in Japanese Unexamined Patent Application Publication No. 2005-315326, a body is disposed between the movable iron core and a flow passage block, the body having a swing member which swings a diaphragm serving as the valve member and two pushing members which push the swing member; therefore, the width of the solenoid unit and the longitudinal dimension of the solenoid valve are not reducible. Additionally, in Japanese Unexamined Utility Model Application Publication No. S35-21653, although a stroke between a fixed iron core and a movable iron core is extended and is prepared as the stroke of valve 10, this structure also fails to avoid an increase in width. In this manner, the conventional solenoid valve, in which the swing member opens and closes the valve member, has limitations in reducing its size.

An object of the present invention is to reduce the size of the solenoid valve.

A solenoid valve according to the present invention has a valve member which is operated to abut on a valve seat to block communication between ports in a closed position, and is operated to separate from the valve seat to enable communication between said ports in an open position, the solenoid valve comprising: a solenoid having a bobbin which includes: a fixed iron core disposed on a base end side of the bobbin; a movable iron core disposed on a tip end side of the bobbin so as to reciprocatively move in an axial direction; and a coil wound around the bobbin; a valve housing provided with the ports and attached to the solenoid; a swing member in which a longitudinally-center portion is swingably attached to the valve housing by a swinging shaft, and is provided with the valve member; and a pivotal lever having: a base end pivotally attached to the valve housing by a pivot shaft; an actuating portion provided on a tip end of the lever, the actuating portion abutting on one end of the swing member; and an effort portion provided between the base end and the actuating portion, the effort portion abutting on a tip end of the movable iron core; wherein the valve member is operated to open and close the ports through a moving stroke in the axial direction of the movable iron core which is extended by the pivotal lever.

The above-mentioned solenoid valve has the swing member provided with the valve member, and the swing member swings to open and close the ports using the valve member. Reciprocating movements in the axial directions of the movable iron core are converted into swinging movements of the swing member through a pivotal lever. The base end of the pivotal lever is pivotally supported by the pivot shaft; the actuating portion provided on the tip end of the pivotal lever abuts on one end of the swing member; and the effort portion provided between the base end and the actuating portion abuts on the tip end of the movable iron core. The pivotal lever extends a reciprocating stroke of the movable iron core; thereby an opening/closing stroke of the valve member is larger than the reciprocating stroke of the movable iron core. Thus, the solenoid valve can be reduced in size.

DETAILED DESCRIPTION

Figure 1:
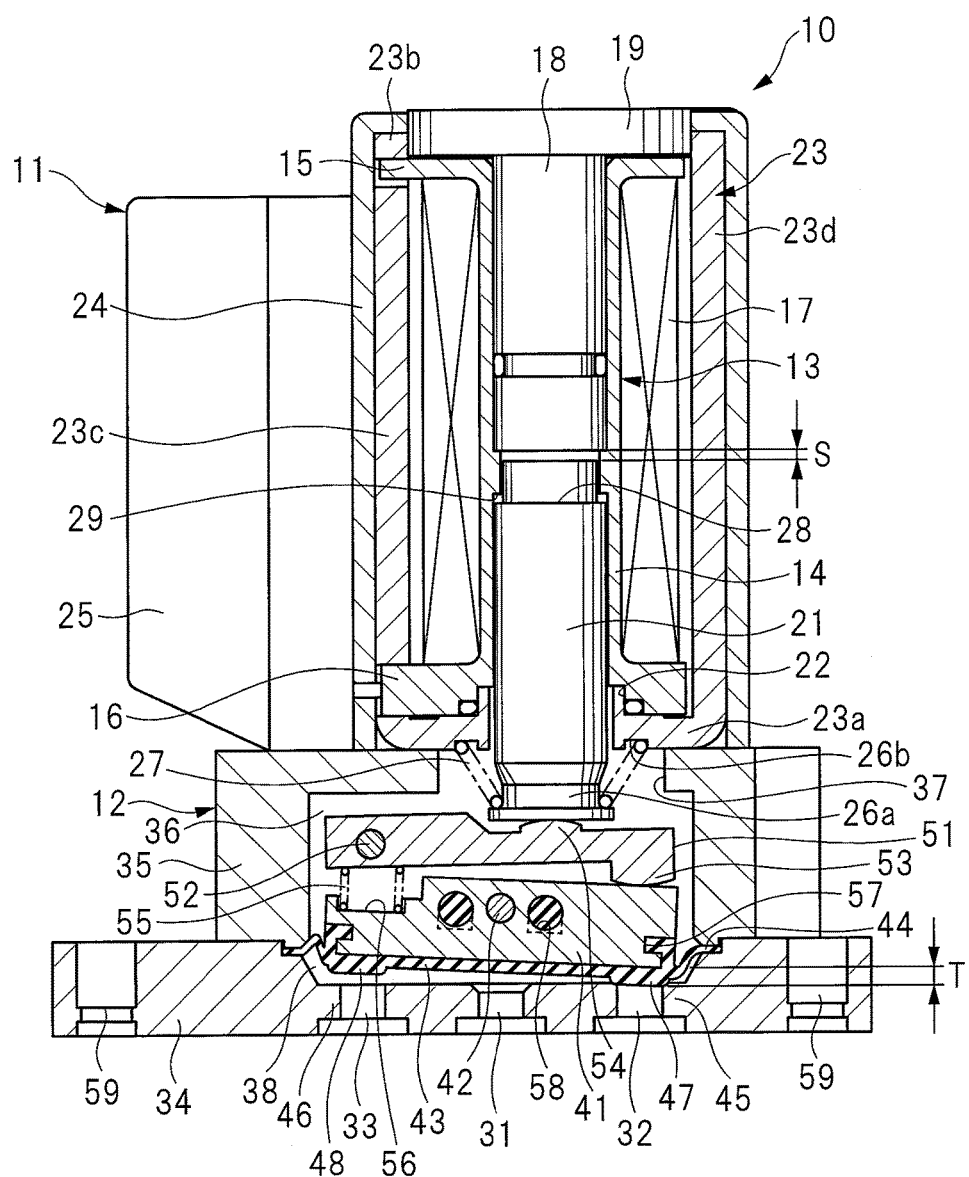
FIG. 1 is a cross-sectional view showing a solenoid valve according to one embodiment of the present invention with the coil de-energized.
Figure 2:
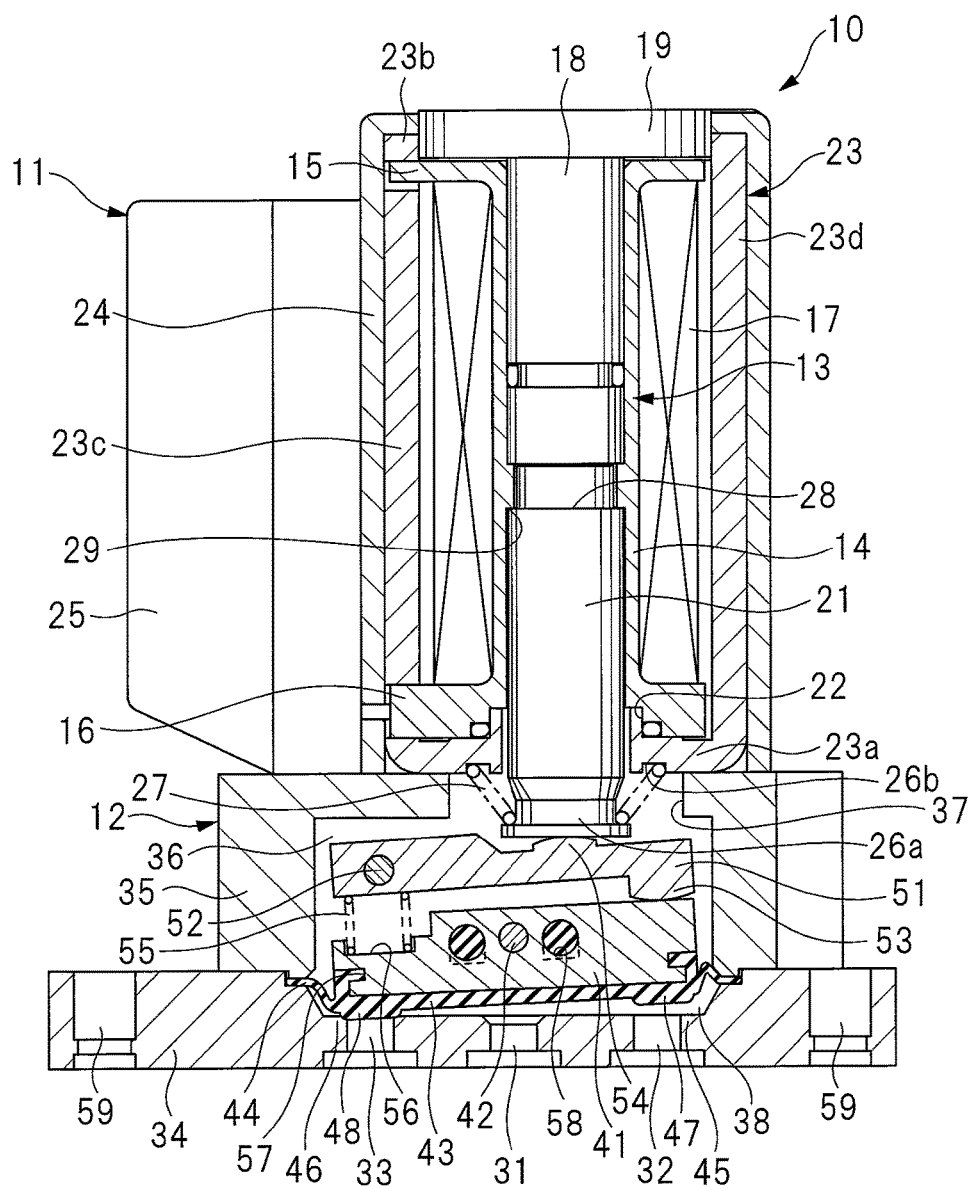
FIG. 2 is a cross-sectional view showing the solenoid valve of FIG. 1 with the coil energized.

Hereinafter, embodiments of the present invention will be described in detail on the basis of the drawings. As shown in FIGS. 1 and 2, a solenoid valve 10 is provided with a solenoid 11, and a valve housing 12 attached to the solenoid 11. The solenoid 11 is provided with a bobbin 13 of non-magnetic material. The bobbin 13 is provided with: a cylindrical main body 14; a flange portion 15 which is integrally formed on the base end side of the cylindrical main body 14; and a flange portion 16 which is integrally formed on the tip end side of the cylindrical main body 14. A coil 17 is wound around the outside of the cylindrical main body 14. A fixed iron core 18 is disposed on a base end side of the bobbin 13. A flange portion 19 which is provided at a base end of the fixed iron core 18 abuts on the flange portion 15 of the bobbin 13, fixing the fixed iron core 18 onto the bobbin 13.

A movable iron core 21 is disposed on a tip end side of the bobbin 13 so as to reciprocatively move in axial directions; hence the movable iron core 21 is axially movable. The movable iron core 21 protrudes toward the front side of the solenoid 11 from a through-hole 22 provided in the flange portion 16. The bobbin 13 is assembled into a magnetic frame 23. The magnetic frame 23 is provided with: a front frame member 23a which abuts on the flange portion 16; a rear frame member 23b in which the flange portion 19 of the fixed iron core 18 is assembled; and side frame members 23c and 23d which are integrally formed respectively with the front frame member 23a and the rear frame member 23b. The magnetic frame 23 is housed inside a solenoid case 24. A socket 25 is provided on the solenoid case 24. A connector (not shown) is attached to the socket 25, and a driving current is supplied to the coil 17 from the outside through the connector.

The tip end of the movable iron core 21 has a constricted portion 26a; an iron core driving spring member 27 is installed between the constricted portion 26a and an annular groove portion 26b on the front frame member 23a of the magnetic frame 23. The iron core driving spring member 27 is a conical compression coil spring, and by a spring force of this iron core driving spring member 27, the movable iron core 21 is urged in a direction to protrude from the solenoid 11. When the coil 17 has no driving current applied and is de-energized, the movable iron core 21 is driven by the spring force toward a protruding direction, as shown in FIG. 1. On the other hand, when the coil 17 has a driving current applied and is energized, the movable iron core 21 is driven to be pulled back toward the tip end side of the fixed iron core 18, as shown in FIG. 2. When driven to be pulled back, the retreat limit position of the movable iron core 21 is regulated by a step portion 28 of the movable iron core 21 abutting on a stopper 29 which is provided on the inner surface of the bobbin 13. The movable iron core 21 reciprocatively moves within a range of moving stroke "S" in axial directions.

The valve housing 12 has a port plate 34 provided with a first port 31, a second port 32, and a third port 33. The solenoid valve 10 is a three-port solenoid valve. A valve accommodated casing 35 is assembled on the port plate 34. A valve housing chamber 36 is provided in the valve accommodated casing 35, and the port plate 34 abuts on an opening end side of the valve housing chamber 36. A through-hole 37 is provided on the valve accommodated casing 35 so as to open toward an attaching face which the solenoid 11 is attached, and the tip end of the movable iron core 21 protrudes into the valve housing chamber 36 through the through-hole 37.

Inside the valve housing chamber 36, a swing member 41 is provided on a front side past the tip end surface of the movable iron core 21. The swing member 41 is disposed so as to extend in a direction which crosses the front side of the movable iron core 21. The swing member 41 is swingably attached to the valve housing 12 by a swinging shaft 42 penetrating a center portion in the longitudinal direction of the swing member. The swinging shaft 42 is attached to the valve housing 12. Therefore, the swing member 41 swings by using the swinging shaft 42 which serves as a fulcrum, and the two ends of the swing member 41 draw near and separate from the port plate 34. A valve member 43 of rubber material is installed on the swing member 41. This valve member 43 has an outer peripheral portion 44. The outer peripheral portion 44 is sandwiched between the port plate 34 and the valve accommodated casing 35 so as to seal the gap between the two members. The valve member 43 has its outer peripheral portion 44 elastically deformed, and has such a structure as to seal the gap between the port plate 34 and the valve accommodated casing 35, thereby serving as a diaphragm. This diaphragm, that is, the valve member 43, divides a space inside the valve housing 12 into the valve housing chamber 36 and a communication chamber 38.

The three ports 31 to 33 formed on the port plate 34 are opened to the communication chamber 38. The ports 31 to 33 are mutually formed in parallel with the port plate 34 along the swing member 41, each disposed with predetermined spacing therebetween. The opening of the second port 32 on the communication chamber 38 side forms a first valve seat 45, and the opening of the third port 33 on the communication chamber 38 side forms a second valve seat 46. A first opening/closing portion 47, which abuts on the first valve seat 45 to open and close the second port 32, and a second opening/closing portion 48, which abuts on the second valve seat 46 to open and close the third port 33, are formed on the valve member 43. The opening/closing portions 47 and 48 are formed on respective portions of the valve member 43 protruding toward the port plate 34.

A pivotal lever 51, which is positioned between the movable iron core 21 and the swing member 41, is disposed inside the valve housing chamber 36 along the swing member 41. The pivotal lever 51 is pivotally attached to the inside of the valve housing 12 by a pivot shaft 52 penetrating the base end of the lever. The pivot shaft 52 is attached to the valve housing 12. An actuating portion 53, which is provided on the tip end of the pivotal lever 51, abuts on one end of the swing member 41. An effort portion 54, which is provided between the base end of the pivotal lever 51 and the actuating portion 53, abuts on the tip of the movable iron core 21. The actuating portion 53 and the effort portion 54 each have convex faces which curve along the longitudinal direction of the pivotal lever 51; the actuating portion 53 is made in linear contact with the swing member 41, and the effort portion 54 is made in linear contact with the tip of the movable iron core 21.

The pivotal lever 51 has a lever structure in which: the pivot shaft 52 at the base end of the lever serves as a fulcrum; the actuating portion 53 at the tip end serves as a "point of load"; and the effort portion 54 between the base end and the tip end serves as a "point of effort". Since the length between the fulcrum and the "point of load" is longer than the length between the fulcrum and the "point of effort", the stroke of the effort portion is extended and forms a moving stroke for the "point of load". In other words, the moving stroke "S" in the axial direction of the movable iron core 21 is extended by the pivotal lever 51. Thus the moving stroke "S" of the movable iron core 21 is converted into respective swinging strokes of the two ends of the swing member 41, that is, each opening/closing stroke "T" of the valve member 43. The opening/closing stroke "T" of the two ends of the swing member 41 is larger than the moving stroke "S" in the axial direction of the movable iron core. Since the moving stroke "S" of the movable iron core 21 is small, the power consumption of the solenoid becomes low. On the other hand, since the opening/closing stroke "T" of each of the two ends of the swing member 41 is large, the movements of the opening/closing portions 47 and 48 provided on the valve member 43 make the openings of the ports large, thereby increasing the flow rate. In other words, the solenoid valve 10 has a high flow rate with low power consumption, although small in size.

A swing spring member 55 is provided between the base end of the pivotal lever 51 and one end of the swing member 41. The swing spring member 55 is a cylindrical compressed coil spring, and one end of the swing spring member 55 is fitted into a groove 56 provided on the swing member 41. By a spring force of this spring member 55, one end of the swing member 41 is urged in a direction to proceed toward the actuating portion 53 of the pivotal lever 51, while the other end is moved away from the base end of the pivotal lever 51. A force exerted by the iron core driving spring member 27 which pushes one end of the swing member 41 to close the second port is greater than the force exerted by the swing spring member 55 which pushes the other end of the swing member 41 to close the third port. Therefore, when no driving current is flowing through the coil 17, the second port is closed by the force of the iron core driving spring member 27.

The swing spring member 55 is provided between the base end of the pivotal lever 51 and the other end of the swing member 41. Moreover, the pivot shaft 52 of the pivotal lever 51 compatibly functions as a spring receiver for the swing spring member 55. In this manner, the swing spring member 55 is installed in a narrow gap and prevents the length and width of the solenoid valve 10 to increase.

The swing member 41 has a lever structure in which: the swinging shaft 42 at the center portion in the longitudinal direction serves as a fulcrum; one end abutting on the actuating portion 53 of the pivotal lever 51 serves as a "point of load"; and the other end, to which the spring force of the swing spring member 55 is applied, serves as a "point of effort". Since the distance between the fulcrum and the "point of load" is equal to the distance between the fulcrum and the "point of effort", the swinging strokes of the two ends of the swing member 41 are mutually the same.

The first port 31 of the solenoid valve 10 serves as a supply port which is supplied with pressurized fluid from the outside; and the other two ports 32 and 33 serve as respective output ports. Therefore, when the coil 17 has no driving current applied and is de-energized, the actuating portion 53, or the "point of load" of the pivotal lever 51 is pushed onto one end of the swing member 41, or the corresponding "point of load", by the spring force applied to the movable iron core 21 from the iron core driving spring member 27; thereby the first opening/closing portion 47 is pushed onto the first valve seat 45, and the second port 32 is closed, as shown in FIG. 1. Thus, the valve member 43 is set to a closed position to block communication between the first port 31 and the second port 32. At this time, the second opening/closing portion 48 is separated from the second valve seat 46, and the valve member 43 is set to an open position to allow the first port 31 and the third port 33 to communicate with each other, whereby pressurized fluid supplied to the first port 31 is further supplied to the outside through the third port 33.

On the other hand, when the coil 17 has a driving current applied and is energized, as shown in FIG. 2, the movable iron core 21 is driven to the retreat limit position against the spring force of the iron core driving spring member 27. The swing spring member 55 has a spring force which is applied to push the second opening/closing portion 48 onto the second valve seat 46. By this spring force, the other end of the swing member 41, that is, the "point of effort", is urged to push the second opening/closing portion 48 onto the second valve seat 46. Thus, the valve member 43 is set to a closed position to block communication between the first port 31 and the third port 33. At this time, the first opening/closing portion 47 is separated from the first valve seat 45, and the valve member 43 is set to an open position to allow the first port 31 and the second port 32 to communicate with each other, whereby pressurized fluid is supplied to the first port 31 and is then output through the second port 32.

The opening/closing stroke "T" between one end of the swing member 41, that is, the corresponding "point of load", and the other end, that is, the corresponding "point of effort", is larger than the moving stroke "S" of the movable iron core 21.

The valve member 43 of rubber material is fixed onto the swing member 41 by vulcanization molding. A concave groove 57 in which the rubber material enters is provided on the outer peripheral portion of the swing member 41 so as to fix the rubber material onto the swing member 41 during vulcanization molding. Additionally, a rubber injection hole 58 is provided and opened on an outer surface of the swing member 41. Thus, upon molding the valve member 43, the rubber material enters the concave groove 57 and the rubber injection hole 58, and firmly fixes the valve member 43 onto the swing member 41.

Mounting holes 59 are provided on the port plate 34 to attach the solenoid valve 10 to a member (not shown). Upon assembling a manifold solenoid valve by collectively mounting a plurality of solenoid valves 10 on a manifold base, the port plate 34 is mounted on the manifold base. On the other hand, upon mounting solenoid valves 10 on a manifold base in which ports are provided, the valve accommodated casing 35 may be directly attached to the manifold base.

Figure 3:
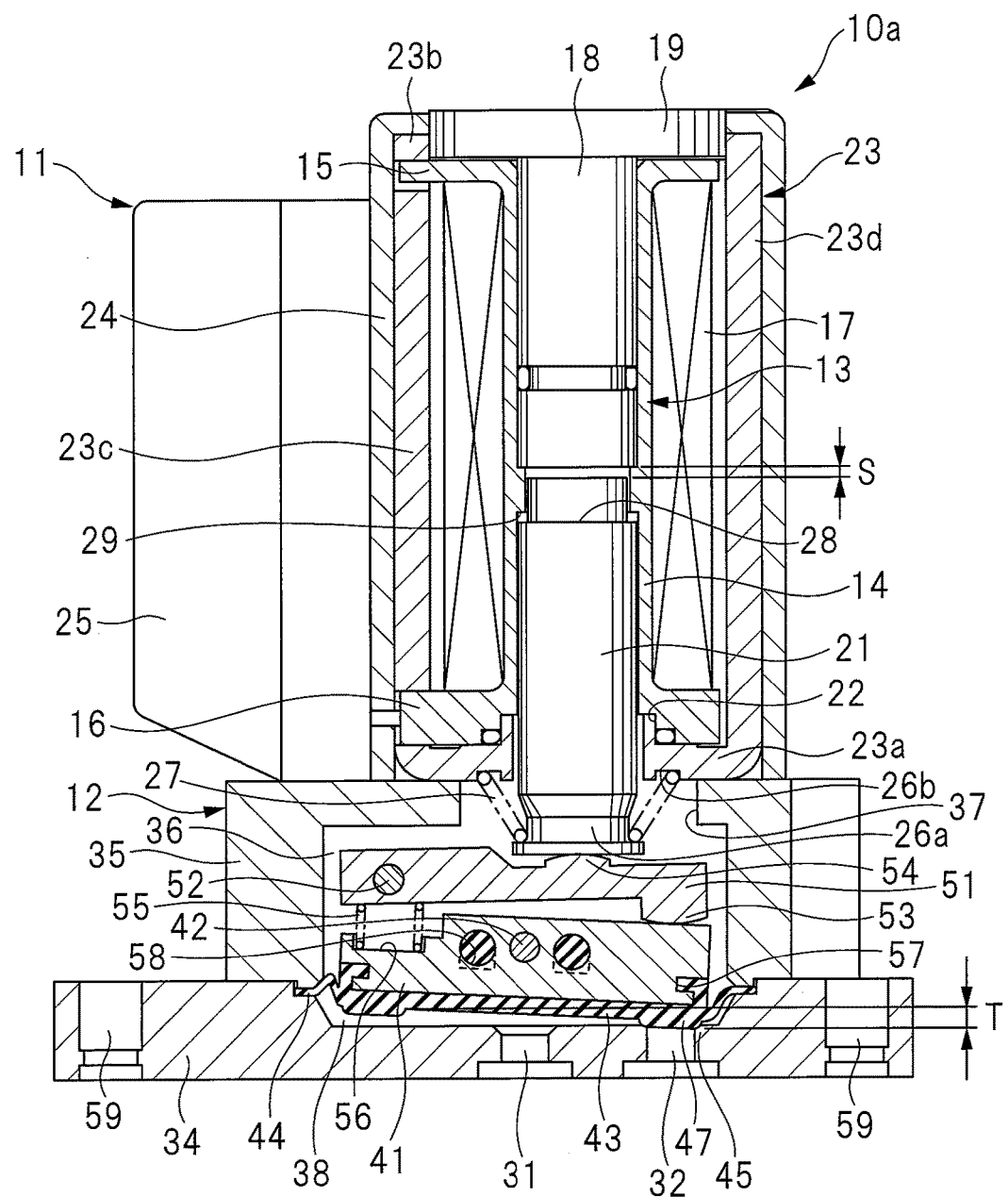
FIG. 3 is a cross-sectional view showing a solenoid valve according to another embodiment of the present invention with the coil de-energized.
Figure 4:
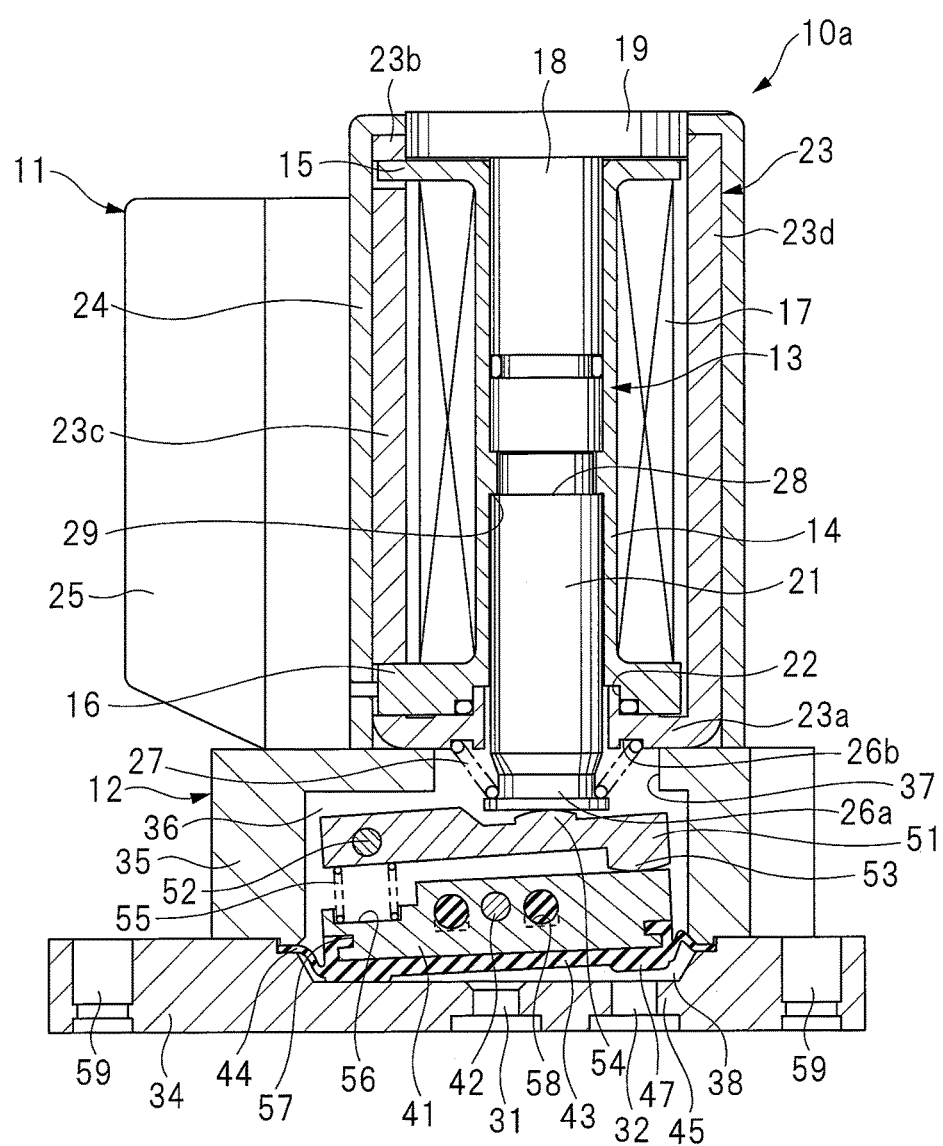
FIG. 4 is a cross-sectional view showing the solenoid valve of FIG. 3 with the coil energized.

FIGS. 3 and 4 are cross-sectional views of a solenoid valve 10a relating to another embodiment, and FIG. 3 shows a coil in a de-energized state, while FIG. 4 shows a coil in an energized state. In FIGS. 3 and 4, common components shown in FIGS. 1 and 2 are indicated by the same reference numbers, and repeated descriptions will be omitted.

The solenoid valve 10a is provided with a first port 31 and a second port 32. In contrast to the aforementioned solenoid valve 10 having the third port 33, the solenoid valve 10a does not have a third port 33, and thus the solenoid valve 10a is a two-port solenoid valve. A first opening/closing portion 47 is provided on a valve member 43, but a second opening/closing portion 48 is not provided. Additionally, the second valve seat 46 mentioned in the previous embodiment is not installed on a port plate 34. Other configurations of the solenoid valve 10a are the same as those of the solenoid valve 10.

The first port 31 is an inlet port, and the second port 32 is an output port. Therefore, when a coil 17 has no driving signal applied and is de-energized, as shown in FIG. 3, the first opening/closing portion 47 is pushed onto a first valve seat 45 by a spring force applied to a movable iron core 21 from an iron core driving spring member 27, thereby closing the second port 32. Thus, the valve member 43 is set to a closed position to block communication between the first port 31 and the second port 32.

On the other hand, when the coil 17 has a driving current applied and is energized, as shown in FIG. 4, the movable iron core 21 is driven to a retreat limit position against the spring force of the iron core driving spring member 27. By a spring force of a swing spring member 55, the other end of the swing member 41 is urged in a direction to push toward the port plate 34. The swing member 41 is driven by this spring force. Thus, the first opening/closing portion 47 is separated from the first valve seat 45, and the valve member 43 is set to an open position to allow the first port 31 and the second port 32 to communicate with each other, whereby pressurized fluid is supplied to the first port 31 and is then output through the second port 32.

In this manner, the present invention is applicable to both the three-port solenoid valve and the two-port solenoid valve. In either of the solenoid valves, the movable iron core 21 is axially movable, whereby the movable iron core reciprocatively moves in axial directions; therefore the width of the solenoid 11 can be reduced. Additionally, the stroke in the axial direction of the movable iron core 21 is extended by the pivotal lever 51 and actuates the swing member 41, thereby shortening the longitudinal dimensions of the solenoid valves 10 and 10a. Thus, the solenoid valves 10 and 10a can be reduced in size.

The present invention is not limited to the above-mentioned embodiments, and is able to be variously modified in the range not departing from the substance. For example, the solenoid valves 10 and 10a may be applied to a fluid pressure circuit as an independent solenoid valve, or may be applied to a manifold solenoid valve to which multiple solenoid valves are assembled.

The solenoid valve is applied to a fluid supplying circuit which supplies fluid to an equipment from a fluid supply source, and is used to supply the fluid and switch flow passages.

Although various embodiments of the present invention have been described and shown, the invention is not restricted thereto, but may also be embodied in other ways within the scope of the subject-matter defined in the following claims.

What is claimed is:

1. A solenoid valve having a valve member which is operated between: a closed position in which the valve member abuts on a valve seat to block communication among ports; and an open position in which the valve member separates from the valve seat to enable communication among the ports, the solenoid valve comprising:
    a solenoid having a bobbin which includes: a fixed iron core disposed on a base end side of the bobbin; a movable iron core disposed on a tip end side of the bobbin so as to reciprocatively move in axial directions; and a coil wound around the bobbin;
    a valve housing which is provided with the ports, and is attached to the solenoid;
    a swing member in which a longitudinally-center portion is swingably attached to the valve housing by a swinging shaft, and is provided with the valve member; and
    a pivotal lever having: a base end pivotally attached to the valve housing by a pivot shaft; an actuating portion provided on a tip end thereof, the actuating portion abutting on one end of the swing member; and an effort portion provided between the base end and the actuating portion, the effort portion abutting on a tip end of the movable iron core,
    wherein a moving stroke in the axial direction of the movable iron core is extended by the pivotal lever so that the valve member is moved to open and close the ports.

2. The solenoid valve according to claim 1, further comprising:
    an iron core driving spring member provided on the movable iron core, the movable iron core urged by a spring force to a direction toward the pivotal lever; and
    a swing spring member disposed between the base end of the pivotal lever and the other end of the swing member, the other end of the swing member urged by a spring force.

3. The solenoid valve according to claim 1, wherein the valve housing is provided with: a first port; and a second port which is opened and closed by the valve member, so that the valve member is switched between: a state in which the second port is allowed to communicate with the first port, and a state in which the second port is blocked from communicating with the first port.

4. The solenoid valve according to claim 1, wherein the valve housing is provided with: a first port; a second port which is opened and closed by the valve member, so that the valve member is switched between: a state in which the second port is allowed to communicate with the first port, and a state in which the second port is blocked from communicating with the first port; and a third port which is opened and closed by the valve member, so that the valve member is switched between: a state in which the third port is blocked from communicating with the first port while the second port is allowed to communicate with the first port, and a state in which the third port is allowed to communicate with the first port while the second port is blocked from communicating with the first port.

5. The solenoid valve according to claim 1, wherein the valve housing has a port plate provided with the ports, and a valve accommodated casing in which the pivotal lever and the swing member are housed, the valve member being a diaphragm used to seal a gap between the port plate and the valve accommodated casing.

6. The solenoid valve according to claim 1, wherein the valve member is made of rubber material, the swing member is provided with a rubber injection hole, and the rubber material enters the rubber injection hole to be fixed onto the swing member during the vulcanization molding of the valve member.

* * * * *